United States Patent [19]

Burney, Jr. et al.

[11] Patent Number: 4,585,801

[45] Date of Patent: Apr. 29, 1986

[54] RE-USE OF FLUOROPOLYMER MEMBRANES

[75] Inventors: Harry S. Burney, Jr., Clute; Donald W. Calvin, Lake Jackson, both of Tex.

[73] Assignee: The Dow Chemical Company, Midland, Mich.

[21] Appl. No.: 362,684

[22] Filed: Mar. 29, 1982

[51] Int. Cl.[4] ............................................. C08J 11/04
[52] U.S. Cl. ...................................... 521/46; 521/40.5
[58] Field of Search ................................ 521/46, 40.5

[56] References Cited

U.S. PATENT DOCUMENTS

| | | | |
|---|---|---|---|
| 3,793,235 | 2/1974 | Goebel | 521/46 |
| 3,972,842 | 8/1976 | Markham | 521/46 |

FOREIGN PATENT DOCUMENTS

| | | | |
|---|---|---|---|
| 52-19794 | 2/1977 | Japan | 521/46 |
| 54-71155 | 6/1979 | Japan | 521/46 |

*Primary Examiner*—Allan M. Lieberman
*Attorney, Agent, or Firm*—W. J. Lee

[57] ABSTRACT

Used or contaminated pieces of fluoropolymer membrane or sheet materials are salvaged for re-use by particulating the materials into powders, granules, or fibers, or otherwise reforming it, treating the particulated material, as desired, to cleanse or modify the material, and utilizing the material in subsequent applications.

12 Claims, No Drawings

RE-USE OF FLUOROPOLYMER MEMBRANES

BACKGROUND OF THE INVENTION

The use of fluoropolymer membranes, sheets, or films as ion-transporting barriers in various processes is becoming more and more common. Of particular interest is the field of electrochemistry wherein fluoropolymer membranes are employed as permselective ion-transport barriers, whereby a liquid medium is substantially barred from passage, yet certain ions contained in the liquid are transported through the barrier.

Various fluoropolymers contain functional pendent acid groups which contain sulfur, phosphorus, or carbon. Salts or other derivatives of these acid groups are known.

For instance, various fluoropolymer membranes having functional acid groups, e.g., sulfonic acid groups, phosphonic acid groups and/or carboxylic acid groups have been suggested for use in separating anolyte from catholyte in electrolytic chlor-alkali cells. Derivatives of the functional sulfonic acid, phosphonic acid and/or carboxylic acid groups on the fluoropolymer chains, which may enhance or moderate the ion-transport properties are, for example, $R_fCOOM$, $R_fCOOX$, $R_fSO_3X$, $R_fSO_3M$, $R_fPO_3X_2$, $R_fPO_3M_2$, and the like, where X is $Na^+$, $Li^+$, $K^+$, or $NH_4^+$, M is an amine radical which may be substituted or unsubstituted, and $R_f$ represents the fluoropolymer segment to which the functional group is attached.

The fluoropolymers are generally prepared by polymerizing fluorine-substituted hydrocarbons having carbon-to-carbon unsaturation, such as tetrafluoroethylene, hexafluoropropylene, vinylidene fluoride, and the like, with the functional sulfonic acid groups and/or carboxylic acid groups attached thereto.

It is known that polytetrafluoroethylene (PTFE) can be particulated and then thermally degraded to monomeric tetrafluoroethylene (TFE) and the monomer may then be re-used.

Fluoropolymers which have become popular in the electrochemical field, as membrane material, include those which have been offered under the tradename of NAFION by E. I. DuPont De Nemours & Company. Methods for making fluoropolymer membranes are shown, e.g., in U.S. Pat. Nos. 3,282,875; 3,624,053; 3,849,243; 3,718,627; 3,969,285; 4,178,218; and 4,259,226.

U.S. Pat. No. 4,259,226 discloses certain fluoropolymers which are soluble in various solvents.

Patents which disclose preparation of fluoropolymers containing pendant carboxylic acid groups are, e.g., U.S. Nos. 3,506,635; 4,151,053; 4,255,240; and 4,176,215 and British Pat. No. 1,145,445.

Patents which disclose particulate forms of acid ion exchange resins for use in Bisphenol processes are, e.g., U.S. Nos. 4,107,218 and 4,191,843.

Over a period of time the fluoropolymer membranes can become damaged and/or become contaminated with deleterious deposits, or otherwise have reduced effectiveness, to an extent such that their replacement is required. There are economic and other practical reasons for salvaging these relatively expensive polymers by putting them to further use.

It is an object of the present invention to avoid having to discard used fluoropolymer membranes.

A further object is to provide a means for altering used fluoropolymer membranes before further use of them.

A still further object is to provide a means for substantially removing unwanted ingredients from a used fluoropolymer resin.

SUMMARY OF THE INVENTION

Used pieces of fluoropolymer membrane or sheet material are put to further use by particulating the material and then further processing the particulate material into useful products, such as acid catalysts, coatings, ion exchangers, or filter materials. The particulating of the material may be done by grinding it to a powder, chopping it to pieces, cutting or shredding it to strips or fibers, or by re-forming it from a solvent or from a melt, depending on the fluoropolymer involved. In some cases, the particulated fluoropolymer may be substantially cleansed of other modifying polymers or other organics or of inorganic or metal values by chemical leaching or by solvent extraction or may have its functional groups, if any, modified or altered by chemical treatment. The particulated fluoropolymer may be used in its particulate form or may be formed into integral articles by the use of pressing, sintering or bonding agents or by depositing on substrates.

Furthermore, used sheets of fluoropolymers can be put to further use, such as acid catalysts, by containing them as folded, coiled, or rolled surfaces in vessels for contact with fluids to be treated or reacted.

DETAILED DESCRIPTION

The fluoropolymers may or may not be any of those having pendent groups which contain sulfur, phosphorus, or carbon, especially any of those which contain, as functional ion-exchange or ion-transport groups, sulfonic acid, phosphonic acid, and/or carboxylic acid groups or derivatives of such acid groups. The softening temperature, melting temperature, and/or solubility in various organic solvents is dependent on which fluoropolymer is involved. Any ion-exchange and ion-transport properties are largely dependent on the functional groups on the fluoropolymer chain and on the equivalent weight of the fluoropolymer. In some applications, these fluoropolymers are employed as water-impermeable membranes and in some applications they are employed as membranes having limited permeability to water.

There are some fluoropolymer membranes which are comprised of two or more layers in which the layers may be substantially the same or may be intentionally different from each other. Some of these membranes contain reinforcing scrim or mesh layers which may be fluoropolymers or may be some other material, such as metal mesh or a polyolefin screen material.

In any case, the fluoropolymer membranes can become damaged, blistered, punctured, contaminated, partially degraded, or otherwise become less efficient in their intended service, thus causing them to require replacement. The present invention is directed not to the initial preparation of the virgin fluoropolymers and the membranes made therefrom, but to the salvaging of such used fluoropolymer membranes.

The particulating of the used fluoropolymer membrane materials may be done by grinding, chopping, cutting, shredding, or re-forming it from a solvent or from a melt. Re-forming may be performed on a substrate or support.

The term "particulating" is used herein to mean the converting of the physical state of the membrane material to that of a powder, to small pieces or flakes, to granules, to strips, to a fibrous form, or to any such particle form. Grinding or chopping is usually enhanced if done at low temperatures where the polymer is more brittle. Re-forming from a solvent or from a melt may not be possible with some of the fluoropolymer membranes, unless the functional groups are chemically treated to convert them to a form which permits the polymer to become solubilized or meltable. Those polymers which are not readily meltable, but which may be softened at high temperature, may require vigorous treatment, such as high pressure extrusion through a die to form strands which can be chopped into pellets or fibers.

Some of the fluoropolymers which contain sulfonyl salt derivatives, such as sulfonamide groups, are quite difficult to dissolve or to heat-soften. Such a fluoropolymer may be subjected to acid hydrolysis to convert the sulfonyl salt groups (such as sulfonamide groups) to sulfonic acid or otherwise converted to sulfonyl fluoride or sulfonyl chloride groups to cause them to have a lower softening temperature or to be more easily swelled by solvents. These treatments may be done before the used membrane has been particulated, but since the particulated form offers greater surface area, then particulating of the used membrane prior to treatment is preferred.

Fluoropolymer sheets or membranes which contain inorganic or metal materials, either as additives or as contaminants, may be particulated either before or after the inorganic or metal materials are dissolved out, such as with a strong acid. This includes those membranes which contain accumulations of hardness values ($Mg^{++}$, $Ca^{++}$, etc.) or other contaminants, such as Fe compounds, which are sometimes picked up by the membranes from aqueous electrolytes. It also includes such things as metal screen or gauze which may have been included in the membrane structures as substrates, stiffeners or strengtheners. By first particulating the used membrane into small pieces, these inorganic or metal ingredients can be more easily and efficiently dissolved out.

Fluoropolymer membranes which contain other organic solids, such as polyolefin fibers, screen or gauze used as strengtheners, may be particulated and then subjected to a solvent which dissolves the organic solid out of the fluoropolymer. In some cases, e.g., where one fluoropolymer layer is used as a scrim or laminated screen layer on another fluoropolymer, physical separations may be made, such as by peeling them apart.

In those instances wherein the used membrane is desired to be used, e.g., as an acid catalyst, but is not to be particulated, it may be folded, coiled, or rolled up and placed in a reaction vessel through which reactant fluids are passed. One particular method of folding is that of corrugating and compressing the sheet in accordian fashion, the extent of compression largely governing the dimensions of flow-paths or channels through the vessel in which it is placed. Another particular method of fashioning the membrane for insertion into a reaction vessel, especially a circular vessel such as a pipe, is to roll the membrane up, somewhat like a rolled newspaper; here again, the dimensions of the flow-paths or channels through the vessel will be governed largely by the tightness of the roll. More than one membrane piece, whether folded or coiled, may be used in substantially packing the vessel to the extent desired to assure adequate contact with the fluids passed through the vessel. Furthermore, stacks of the membrane sheets may be employed in the contacting vessel. Perforations or slits may be provided in the sheets, even in the folded, coiled, or rolled sheets. Extraneous or unwanted ingredients in or on the salvaged membrane sheet may be washed, leached, or dissolved out prior to contacting it with the desired reactant fluids passed through the vessel; alternately, the initial portion of reactant fluid may be used as the cleanser for the salvaged fluoropolymer membrane material.

The following examples are given as an illustration of certain embodiments of the present invention, but the invention is not limited to the particular embodiments illustrated.

EXAMPLE 1

A used membrane is removed from a chlor-alkali electrolytic cell. The membrane comprises a fluoropolymer having sulfonic acid salt functional groups and contains embedded therein small polytetrafluoroethylene fibers as strengtheners. The membrane also contains an accrual of hardness values and other metal or inorganic contaminants picked up from its service in the aqueous electrolyte of the cell.

The membrane is ground up to a powder or granular form and subjected to a strong hydrochloric acid solution to substantially remove the inorganic and metal contaminants.

The fluoropolymer particles, now containing functional groups of sulfonic acid in the free acid form, are pressed into pellets.

The so-formed pellets are found to be useful as acid catalysts in the preparation of Bisphenol A (a diphenylolpropane) by promoting the reaction of phenol with acetone, a reaction which is known to be catalyzed by an acid catalyst.

EXAMPLE 2

A used fluoropolymer as in Example 1 is particulated into fiber form in a shredder and the so-formed fibers are subjected to the cleansing effects of a strong acid solution. The so-formed fibers are hot-pressed into a sintered mat which is found to be useful as a filter material. The so-formed fibers are also found to be useful as strengthening fibers in a fluoropolymer membrane prepared from virgin fluoropolymer.

EXAMPLE 3

A used fluoropolymer membrane having functional -COONa groups, and containing polytetrafluoroethylene fibers for reinforcement, is ground up into small pieces and placed in a vessel. The pieces are treated with strong aq. HCl, converted to the $Li^+$ salt form by contact with aq. LiOH, and washed with $H_2O$. A solvent (methanol) is used to dissolve the carboxyl-containing fluoropolymer away from the insoluble PTFE fibers. The polymer is precipitated from solution as a powder, and the powder is pressed into pellets. The pelleted polymer is found to be effective as an acid catalyst.

EXAMPLE 4

A used fluoropolymer ion exchange membrane is removed from a chlor-alkali cell and treated with strong acid to remove hardness and to put the membrane in the free acid form. The membrane is then tightly rolled into a cylinder and inserted into a pipe. The reaction of phenol with acetone to prepare diphenylolpropane is found to be catalyzed by the rolled membrane when reactants are passed through the pipe.

We claim:

1. A method for salvaging, for reuse, used flurorpolymer membrane or sheet material from usage in electrochemical applications, said method comprising
folding, coiling, rolling, or stacking said material in a vessel suitable for the contacting of the said material with fluids, wherein
the said material is cleansed of soluble or leachable ingredients or contaminants by use of a solvent or chemical suitable therefor, and
wherein the material is cut into fibrous form after the cleansing action, and the fibrous material is pressed into a porous sheet form.

2. A method for salvaging, for reuse, used fluoropolymer membrane or sheet material from usage in electrochemical applications, said method comprising
folding, coiling, rolling, or stacking said material in a vessel suitable for the contacting of the said material with fluids, wherein
the said material is cleansed of soluble or leachable ingredients or contaminants by use of a solvent or chemical suitable therefor, and
wherein the fluoropolymer material contains other polymeric ingredients, and wherein said fluoropolymer material is dissolved in a solvent in which the other polymeric ingredients are not soluble, separating the dissolved fluoropolymer material from said insoluble other polymeric ingredients, and reforming said dissolved fluoropolymer material for use in a subseqeunt application.

3. A method for salvaging, for re-use, used fluoropolymer membrane or sheet material from usage in electrochemical applications, said method comprising
folding, coiling, rolling, or stacking said material in a vessel suitable for the contacting of the said material with fluids, wherein
the said material is cleansed of soluble or leachable ingredients or contaminants by use of a solvent or chemical suitable therefor
wherein the used fluoropolymer material is provided with a plurality of perforations and/or slits.

4. A method for salvaging, for re-use, used fluoropolymer membrane or sheet material from usage in electrochemical applications, said method comprising
folding, coiling, rolling, or stacking said material in a vessel suitable for the contacting of the said material with fluids, wherein
the said material is cleansed of soluble or leachable ingredients or contaminants by use of a solvent or chemical suitable therefor, and
wherein the said material in a vessel contains pendent acid groups and is employed as an acid catalyst.

5. A method for salvaging, for re-use, used fluoropolymer membrane or sheet material from usage in electrochemical applications, said method comprising
folding, coiling, rolling, or stacking said material in a vessel suitable for the contacting of the said material with fluids, wherein
the said material is cleansed of soluble or leachable ingredients or contaminants by use of a solvent or chemical suitable therefor, and
wherein the fluoropolymer material contains functional groups and where said material is employed as an ion exchange polymer.

6. The method of claim 1, 2, 3, 4 or 5 wherein the flouropolymer contains pendent groups comprising at least one of the types which conform to the empirical formulae $R_fCOOH$, $R_fSO_3H$, $R_fSO_2H$, $R_fPO_3H$, $R_fCOOM$, $R_fCOOX$, $R_fSO_3X$, $R_fSO_2M$, $R_fPO_3X_2$, and $R_fPO_3M_2$,
where $R_f$ represents the fluoropolymer segment to which the pendent groups are attached,
M is an amine radical which may be substituted or unsubstituted, and
X is $Na^+$, $Li^+$, $K^+$, or $NH_4^+$.

7. The method of claim 1, 2, 3, 4 or 5 wherein the fluoropolymer material contains inorganic or metal ingredients or contaminants and wherein the material is subjected to the cleansing action of an acid to substantially remove said inorganic or metal ingredients or contaminants.

8. The method of claim 1, 2, 3, 4 or 5 wherein the fluoropolymer material contains other organic ingredients and wherein the material is subjected to the cleansing action of a solvent which substantially removes the said organic ingredients.

9. The method of claim 1, 2, 3 or 5 wherein the fluoropolymer is subjected to hydrolysis to convert any pendent salt groups present thereon to the acid form.

10. The method of claim 1 wherein the porous sheet form is employed as a filter.

11. The method of claim 2 wherein the reforming of said dissolved fluoropolymer material comprises applying the solution to a substrate and removing the solvent, leaving the fluoropolymer material deposited on the substrate.

12. The method of claim 4 wherein the said material in a vessel is employed as an acid catalyst in the production of a bisphenol product.

* * * * *

UNITED STATES PATENT AND TRADEMARK OFFICE
CERTIFICATE OF CORRECTION

PATENT NO. : 4,585,801
DATED : April 29, 1986
INVENTOR(S) : Harry S. Burney, Jr. and Donald W. Calvin It is certified that error appears in the above-identified patent and that said Letters Patent is hereby corrected as shown below:

Col. 5, line 6, change "fluror-" to --fluoro- --.

Col. 5, line 35, change "subseqeunt" to --subsequent--.

Col. 6, line 19, change "flouropolymer" to --fluoropolymer--.

Col. 6, line 22, change the subscript capitol "F" to subscript lower case --f--.

Signed and Sealed this

Ninth Day of September 1986

[SEAL]

*Attest:*

DONALD J. QUIGG

*Attesting Officer*   *Commissioner of Patents and Trademarks*